US010194379B2

(12) United States Patent
Martin et al.

(10) Patent No.: US 10,194,379 B2
(45) Date of Patent: Jan. 29, 2019

(54) DISCOVERY AND SECURITY IN LWA COMMUNICATION

(71) Applicant: ARRIS Enterprises LLC, Suwanee, GA (US)

(72) Inventors: Steve A. Martin, San Jose, CA (US); Henry H. Tzeng, San Jose, CA (US); Sudhakar Padala, Sunnyvale, CA (US); Ron Mok, Sunnyvale, CA (US); Shailender Potharaju, Fremont, CA (US); Stuart Kerry, Morgan Hill, CA (US); Sandip C. Patel, San Jose, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 191 days.

(21) Appl. No.: 14/986,508

(22) Filed: Dec. 31, 2015

(65) Prior Publication Data
US 2017/0041859 A1    Feb. 9, 2017

Related U.S. Application Data

(60) Provisional application No. 62/201,843, filed on Aug. 6, 2015.

(51) Int. Cl.
H04W 48/16    (2009.01)
H04W 12/08    (2009.01)
(Continued)

(52) U.S. Cl.
CPC ........... *H04W 48/16* (2013.01); *H04W 12/08* (2013.01); *H04W 84/042* (2013.01); *H04W 84/12* (2013.01)

(58) Field of Classification Search
CPC ..... H04W 12/08; H04W 12/04; H04W 48/16; H04W 48/20; H04W 84/042; H04W 84/12
See application file for complete search history.

(56) References Cited

U.S. PATENT DOCUMENTS 9,788,242 B2 * 10/2017 Nuggehalli ....... H04W 36/0022
2004/0008645 A1    1/2004 Janevski ...................... 370/331
(Continued)

FOREIGN PATENT DOCUMENTS

WO    WO 2015-042189    3/2015
WO    WO 2015-088264    6/2015
WO    WO 2015-108462    7/2015

OTHER PUBLICATIONS

International Search Report and Written Opinion for PCT/US2016/045873, dated Dec. 15, 2016.
(Continued)

Primary Examiner — Ahmed Elallam
(74) Attorney, Agent, or Firm — Stewart M. Wiener; Steven E. Stupp

(57) ABSTRACT

During a communication technique, an access point provides a message that includes one or more public land mobile network identifiers of one or more cellular-telephone networks that are supported by the access point. Then, an electronic device, which received the message, provides a candidate list specifying one or more access points that support communication with a cellular telephone network to a radio node that is associated with this cellular-telephone network. By communicating with a wireless-local-area-network (WLAN) controller, the radio node validates the one or more access points, and selects a target access point based on performance feedback from the WLAN controller. Next, the radio node instructs the electronic device to associate with the target access point. Moreover, the radio (Continued)

node and the target access point establish a secure-communication pathway, which allows the radio node to communicate data to the electronic device via the access point using an LTE Wi-Fi aggregation protocol.

20 Claims, 10 Drawing Sheets

(51) Int. Cl.
*H04W 84/04* (2009.01)
*H04W 84/12* (2009.01)

(56) References Cited

U.S. PATENT DOCUMENTS

| | | | |
|---|---|---|---|
| 2005/0185618 A1 | 8/2005 | Friday | 370/331 |
| 2007/0264997 A1 | 11/2007 | Chaudhary | 455/426.1 |
| 2008/0039096 A1 | 2/2008 | Forsberg | 455/438 |
| 2010/0111013 A1 | 5/2010 | Chou | 370/329 |
| 2013/0242965 A1 | 9/2013 | Horn | 370/338 |
| 2014/0043966 A1 | 2/2014 | Lee | 370/230 |
| 2014/0133298 A1 | 5/2014 | Han et al. | 370/230 |
| 2014/0341109 A1 | 11/2014 | Cartmell | 370/328 |
| 2014/0362807 A1 | 12/2014 | Bhatnagar et al. | 370/329 |
| 2015/0029919 A1 | 1/2015 | Han | 370/311 |
| 2015/0109927 A1* | 4/2015 | Ozturk | H04W 36/0027 370/235 |
| 2015/0195858 A1* | 7/2015 | Jin | H04L 41/5051 370/230 |
| 2016/0255632 A1* | 9/2016 | Forssell | H04W 76/025 370/329 |
| 2016/0277974 A1* | 9/2016 | Persson | H04W 48/16 |
| 2016/0302110 A1* | 10/2016 | Baboescu | H04L 12/4633 |
| 2016/0302122 A1* | 10/2016 | Masini | H04L 61/1511 |
| 2016/0345334 A1* | 11/2016 | Veerepalli | H04W 72/0493 |
| 2017/0013513 A1* | 1/2017 | Agarwal | H04W 36/22 |
| 2017/0019782 A1* | 1/2017 | Wu | H04W 12/06 |
| 2017/0156049 A1* | 6/2017 | Bergstrom | H04W 8/08 |
| 2017/0273125 A1* | 9/2017 | Teyeb | H04W 76/022 |
| 2017/0325124 A1* | 11/2017 | Mitra | H04W 28/06 |

OTHER PUBLICATIONS

Nokia Networks, "3C User-Plane Architecture for LTE-WLAN Aggregation," R2-152105, 3GPP TSG-RAN WG2 Meeting #90, Fukuoka, Japan, May 15, 2015.
International Search Report and Written Opinion for PCT/US2015/060937, dated Jun. 24, 2016.

* cited by examiner

DISCOVERY AND SECURITY IN LWA COMMUNICATION

CROSS-REFERENCE TO RELATED APPLICATION

This application claims priority under 35 U.S.C. § 119(e) to U.S. Provisional Application Ser. No. 62/201,843, entitled "Discovery and Security in LWA Communication," by Steve Martin, Henry Tzeng, Sudhakar Padala, Ron Mok, Shailender Potharaju and Stuart Kerry, filed on Aug. 6, 2015, the contents of which are herein incorporated by reference.

BACKGROUND

Field

The described embodiments relate to techniques for communicating information among electronic devices, including communicating data information from a cellular-telephone network via a wireless local area network.

Related Art

Many electronic devices are capable of wirelessly communicating with other electronic devices. For example, these electronic devices can include a networking subsystem that implements a network interface for: a cellular network (UMTS, LTE, etc.), a wireless local area network (e.g., a wireless network such as described in the Institute of Electrical and Electronics Engineers (IEEE) 802.11 standard or Bluetooth from the Bluetooth Special Interest Group of Kirkland, Wash.), and/or another type of wireless network.

While many electronic devices communicate with each other via large networks owned by a network operator, it is often difficult to communicate via a cellular-telephone network, e.g., in high density or crowded environments. In particular, in crowded environments the network performance (such as the block error rate and the capacity) of the cellular-telephone network can be degraded. Moreover, there are often constraints on the number of cellular-telephone towers. Consequently, it can be difficult for the operator of the cellular-telephone network to improve the quality of their service e.g., in crowded environments.

SUMMARY

The described embodiments relate to an access point that establishes communication with an electronic device and a radio node (such as an eNode-B) in a cellular-telephone network. This access point includes: an antenna connector or node (which may be connected to an antenna), and an interface circuit that communicates with the electronic device, the radio node, and a wireless-local-area-network (WLAN) controller. During operation, the access point provides messages that include one or more public land mobile network (PLMN) identifiers of one or more cellular-telephone networks that are supported by the access point. Then, the access point receives information specifying the radio node from the WLAN controller. Moreover, the access point establishes a secure-communication pathway (such as a tunnel) with the radio node based on the information, where the secure-communication pathway takes data associated with frames for a cellular-telephone communication protocol (such as Long Term Evolution or LTE) and encapsulates the data in frames for an IEEE 802.11 communication protocol. Next, the access point associates with the electronic device. Furthermore, the access point receives the data for the electronic device from the radio node via the secure-communication pathway, and provides the data to the electronic device using the IEEE 802.11 communication protocol.

Another embodiment provides the radio node. This radio node includes: an antenna connector or node (which may be connected to an antenna), and an interface circuit that communicates with the electronic device, the access point, and the WLAN controller. During operation, the radio node receives, from the electronic device, a candidate list with information specifying the one or more access points, which support communication with the cellular-telephone network that is associated with the radio node. Then, the radio node validates the one or more access points with the WLAN controller. Moreover, the radio node receives, from the WLAN controller, network addresses of the one or more access points and performance feedback about the one or more access points. Next, the radio node selects a target access point from the one or more access points based on the performance feedback. Furthermore, the radio node set ups the secure-communication pathway with the target access point using a network address, where the secure-communication pathway takes data associated with frames for the LTE communication protocol and encapsulates the data in frames for the IEEE 802.11 communication protocol. Additionally, the radio node instructs the electronic device to associate with the target access point, and provides the data for the electronic device to the target access point via the secure-communication pathway.

In some embodiments, during operation, the interface circuit provides additional data to the electronic device using the LTE communication protocol.

Another embodiment provides the electronic device. This electronic device includes: an antenna connector or node (which may be connected to an antenna), and an interface circuit that communicates with the radio node, the access point, and the WLAN controller. During operation, the electronic device discovers the access point by receiving one or more messages from the access point that include the one or more PLMN identifiers of one or more cellular-telephone networks, including at least the cellular-telephone network associated with the radio node, that are supported by the access point. Then, the electronic device provides the candidate list to the radio node with the information specifying the access point. Moreover, the electronic device receives the instruction from the radio node to associate with the access point. Next, the electronic device receives data from the radio node via the access point using the IEEE 802.11 communication protocol.

In some embodiments, during operation, the interface circuit receives additional data from the radio node using the LTE communication protocol. Moreover, during operation, the interface circuit may aggregate the data and the additional data into LTE datagrams.

Another embodiment provides the WLAN controller. This WLAN controller includes: a connector or node (which may be connected to a network), and an interface circuit that communicates with the radio node and the access point. During operation, the WLAN controller receives, from the radio node, information specifying one or more access points. Then, the WLAN controller accesses the network addresses of the one or more access points and the performance feedback about the one or more access points (such as a priority list of access points based on the performance feedback). Moreover, the WLAN controller provides the network addresses and the performance feedback to the radio node. Next, the WLAN controller provides additional information specifying the radio node to the one or more access points, where the network addresses, the performance feedback and the additional information facilitate establishment of the secure-communication pathway between the radio node and one or more of the one or more access points.

Note that the communication may be via the Internet and/or a wireless network.

Another embodiment provides a computer-program product for use with the access point, the electronic device, the radio node and/or the WLAN controller. This computer-program product includes instructions for at least some of the operations performed by the access point, the electronic device, the radio node and/or the WLAN controller.

Another embodiment provides a method. This method includes at least some of the operations performed by the access point, the electronic device, the radio node and/or the WLAN controller.

This Summary is provided merely for purposes of illustrating some exemplary embodiments, so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Figure 1:
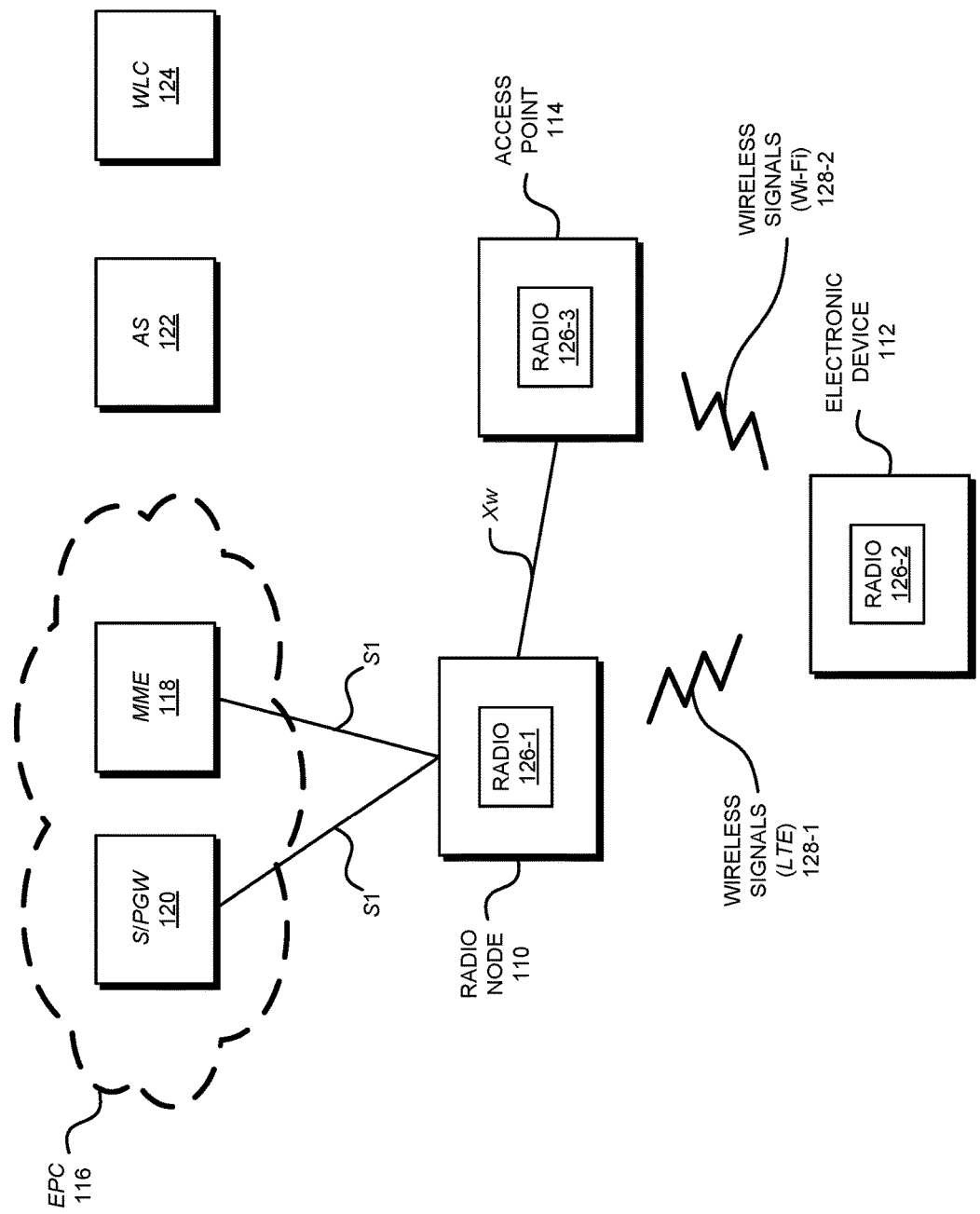
FIG. 1 is a block diagram illustrating electronic devices wirelessly communicating in accordance with an embodiment of the present disclosure.

Table 1 provides an example of the performance feedback that is communicated between the access point and the radio node in FIG. 1 in accordance with an embodiment of the present disclosure.

Note that like reference numerals refer to corresponding parts throughout the drawings. Moreover, multiple instances of the same part are designated by a common prefix separated from an instance number by a dash.

DETAILED DESCRIPTION

A communication technique for establishing communication among an access point, an electronic device, and a radio node in a cellular-telephone network is described. In this communication technique, the access point provides a message that includes one or more public land mobile network (PLMN) identifiers of one or more cellular-telephone networks that are supported by the access point. Then, an electronic device, which received the message, provides a candidate list specifying one or more access points that support communication with a cellular telephone network to a radio node (such as an eNode-B) that is associated with this cellular-telephone network. By communicating with a wireless-local-area-network (WLAN) controller, the radio node validates the one or more access points, and receives network addresses of the one or more access points and performance feedback about the one or more access points. Using the performance feedback, the radio node selects a target access point from the one or more access points. Next, the radio node instructs the electronic device to associate with the target access point. Moreover, the WLAN controller provides additional information specifying the radio node to the target access point. Furthermore, the radio node and the target access point establish a secure-communication pathway, which allows the radio node to communicate data for the electronic device, which is associated with frames for a Long Term Evolution (LTE) communication protocol, in frames for an IEEE 802.11 communication protocol. This may allow the radio node and the access point to perform load or traffic balancing with the electronic device via the secure-communication pathway.

Note that the WLAN controller functions may be performed by a single WLAN controller, a distributed WLAN controller, a virtual WLAN controller or any other such configuration that suffices to manage the one or more access points. Moreover, embodiments of the disclosure are not limited to LTE and could easily be extended to any cellular protocol.

The communication technique may provide a more secure approach for establishing the communication among the access point, the electronic device and the radio node. Moreover, the communication technique may allow the access point to support multiple cellular-telephone networks. Furthermore, the communication technique may leverage existing communication protocols, so the access point, the electronic device and/or the radio node may not need to be modified to implement the communication technique. Consequently, by facilitating improved and more secure communication with the electronic device, the communication technique may increase customer satisfaction and loyalty.

A cellular-telephone network may include base stations (and associated cell towers) that implement so-called 'macrocells.' These macrocells may facilitate communication with hundreds of users (such as hundreds of cellular telephones) over distances of kilometers. In general, the positioning of the cell towers (and the antennas) is carefully designed and optimized to maximize the performance of the cellular-telephone network (such as the throughput, the capacity, the block error rate, etc.) and to reduce crosstalk or interference between the signals transmitted by different cell towers and/or different macrocells. Small cells are generally radio access nodes providing lower power than macrocells and therefore providing smaller coverage areas than macrocells. It is common to subcategorize 'small cells' even further by ascribing relative general ranges. For example, a 'microcell' on a campus might have a range of less than 2 kilometers, a "picocell" in a small office less than 200 meters, and a lemtocell' in a home on the order of 10 meters. These descriptions are for general relative comparison purposes and should not be limiting on the scope of the embodiments of the inventions.

However, there are often gaps in the coverage offered by macrocells. Consequently, some users operate local transceivers that provide short-range communication in the cellular-telephone network. These so-called lemto cells' provide short-range communication (e.g., up to 10 m) for a few individuals.

In addition, larger organizations (such as those with 50-60 users) may operate local transceivers that provide communication in the cellular-telephone network over a range of 100 m. This intermediate-range coverage in the cellular-telephone network can be typically referred to as a 'small cell' as well.

One challenge for operators of cellular-telephone networks is maintaining network performance and quality. For example, it may be difficult to maintain the network performance and the quality of service in high density or crowded environments. While the use of femto cells and/or small cells can mitigate this challenge, there are still often circumstances where the network performance and quality of a cellular-telephone network is degraded.

In principle, access points in wireless local area networks (WLANs) offer a potential solution to this challenge. In particular, large numbers of access points are typically available in high density or crowded environments (such as offices), thereby providing available network infrastructure through which a cellular-telephone network can convey or piggyback packets. In practice, this approach poses a variety of additional challenges in terms of scaling (e.g., to large numbers of access points and/or electronic devices), discovery, security, and performance. These challenges are addressed in the communication technique described below.

In the discussion that follows, Long Term Evolution or LTE (from the 3rd Generation Partnership Project of Sophia Antipolis, Valbonne, France) is used as an illustration of a data communication protocol in a cellular-telephone network and IEEE 802.11 (which is sometimes referred to as 'Wi-Fi' from the Wi-Fi Alliance of Austin, Tex.) is used as an illustration of a communication protocol in a WLAN. For example, the communication technique may include protocols for integrating LTE communications over Wi-Fi links such as contemplated in the LTE Wi-Fi aggregation (LWA) protocol being developed. However, a wide variety of communication techniques or protocols may be used. In order to implement the communication technique, note that changes may be needed in: user equipment (such as cellular telephones), access points, and eNode-Bs or eNBs (which are sometimes referred to as 'radio nodes').

FIG. 1 presents a block diagram illustrating wireless communication among electronic devices according to some embodiments. In particular, radio node 110 can communicate LTE data frames or packets using LTE with an electronic device 112 (which is sometimes referred to as 'user equipment' or UE, such as a cellular telephone and, more generally, a portable electronic device). Based on performance feedback (such as feedback about the LTE and/or Wi-Fi link quality, a quality of service and/or one or more performance metrics, e.g., the network capacity, the network state, etc.), radio node 110 may also communicate (via wireless or wired communication) LTE data frames or packets to an access point 114 (AP) via an interface, such as an Xw interface (and, more generally, an interface that is similar to X2 or a general packet radio service tunneling protocol, such as GTP-U) that encapsulates the LTE packet data convergence protocol (PDCP) datagrams into IEEE 802.11 media access control (MAC) frames. (Although described in the context of Xw, other or future interfaces could be used, i.e., another interface or protocol for communicating between radio node 110 and access point 114.) For example, the tunnel between radio node 110 and access point 114 may strip the headers off the LTE PDCP datagrams, which may then be included in the IEEE 802.11 MAC frames. (More generally, a tunnel may take data in one protocol, encapsulate it and place it into another protocol.)

Then, access point 114 may communicate these IEEE 802.11 frames or packets to electronic device 112 (which supports dual connectivity and packet data convergence protocol aggregation) using Wi-Fi. Next, electronic device 112 may aggregate or re-concatenate the two sources of data frames or packets (i.e., from radio node 110 and access point 114) back into an LTE data stream with LTE PDCP datagrams. (Alternatively, in other embodiments communication protocols such as Bluetooth and/or an Internet-of-Things communication protocol are used.) Note that the communication of data between radio node 110 and access point 114, and then from access point 114 to electronic device 112 may be unidirectional or bidirectional.

However, this approach poses some challenges. In particular, it may be difficult for radio node 110 to discover access point 114 and/or to provide security. For example, many current proposals for LWA-WLAN discovery and selection are based upon the provisioning of a static WLAN service set identifier (SSID) to electronic device 112 by radio node 110 during the LTE registration process. The Wi-Fi connection manager on electronic device 112 may then look for Wi-Fi access points including this SSID in their beacon and/or probe response frames. Once electronic device 112 detects the provisioned SSID in a beacon or a probe response, it may proceed to associate with and attempt to authenticate to that WLAN.

Moreover, many current proposals LWA-WLAN authentication and encryption are based on one of two approaches. A first proposed approach uses IEEE 802.1x authentication with an extensible authentication protocol (such as EAP-SIM, EAP-AKA and/or EAP-AKA'), in which a credential with a cellular-telephone network (which is sometimes referred to as a 'cellular credential') of electronic device 112 (such as a subscriber identity module or SIM, or a universal subscriber identity module or USIM) is used to authenticate the session back to the LWA home network operator's or cellular-telephone carrier's home subscriber server (HSS) or home location register (HLR) via a remote authentication dial-in user service (RADIUS) protocol or messaging. Alternatively, in a second proposed approach, a dynamic pre-shared key (dPSK) is provisioned to electronic device 112 by radio node 110 during the LTE registration process, and this dPSK is then used for Wi-Fi protected access-2 (WPA-2) personal authentication and encryption.

However, the proposal to use a static SSID for LWA-WLAN discovery and selection and/or the proposal to use a dPSK for LWA-WLAN authentication and encryption may not be consistent with the latest advances in carrier and enterprise WLAN systems. Moreover, dPSK (even with an eNB key or KeNB derivation) may be open to relatively easy abuse and disruption.

In order to address these problems, a communication technique may use an access network query protocol (ANQP) information element in an IEEE 802.11u/Hotspot 2.0 communication protocol (from the Wi-Fi Alliance of Austin, Tex.) to perform the LWA-WLAN discovery and selection. In the discussion that follows, the information element is referred to as an 'LWA_PLMN' element, where PLMN refers to a public land mobile network that identifies a cellular-telephone network. (Thus, it is sufficient that the LWA_PLMN may be an identifier of a cellular-telephone network.) Note that Hotspot 2.0, release 2, provides enhanced security via robust authentication and encryption, including the use of a public key infrastructure (PKI) to validate the Wi-Fi infrastructure components.

Figure 2:
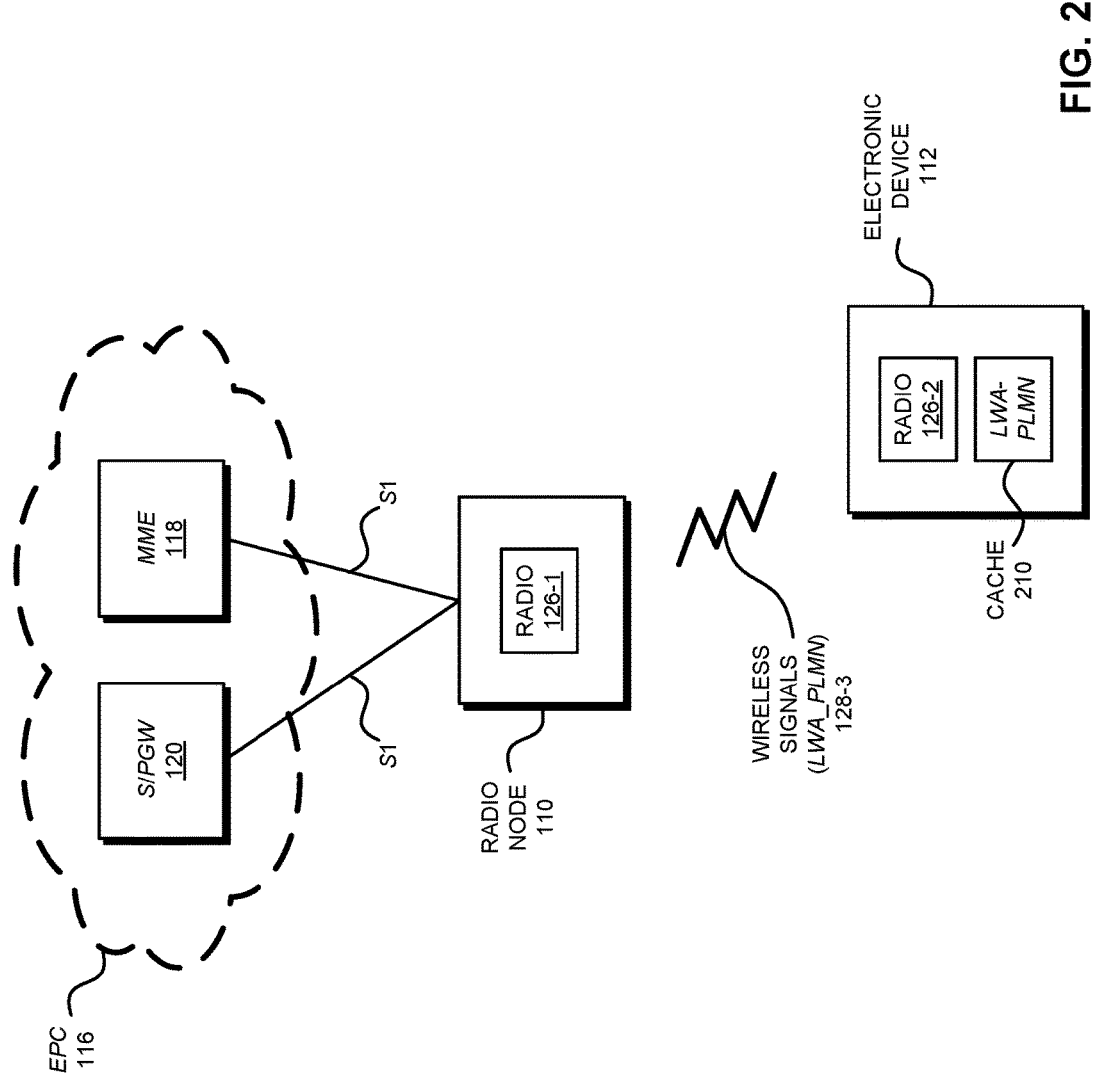
FIG. 2 is a block diagram illustrating Long Term Evolution Wi-Fi aggregation (LWA) registration and provisioning between the radio node and the electronic device in FIG. 1 in accordance with an embodiment of the present disclosure.

As described further below with reference to FIG. 2, the LWA_PLMN element may be provisioned to electronic device 112 by radio node 110 during the LTE registration process. This provisioning may or may not occur with user intervention. The LWA_PLMN element may also be provisioned on the Wi-Fi infrastructure(s) that will be used for LWA services (in lieu of defining a new static SSID), such as access point 114 (FIG. 1). Then, as described further below with reference to FIG. 3, when electronic device 112 comes in range of access point 114 advertising support for a communication protocol (such as Hotspot 2.0) in its beacon and/or probe response frames, electronic device 112 may formulate an ANQP query (either directed or general) in order to ascertain whether access point 114 supports LWA services for the home network operator or the carrier of the cellular-telephone network of electronic device 112. (However, a different communication protocol than ANQP may be used to provide the query.)

Figure 4:
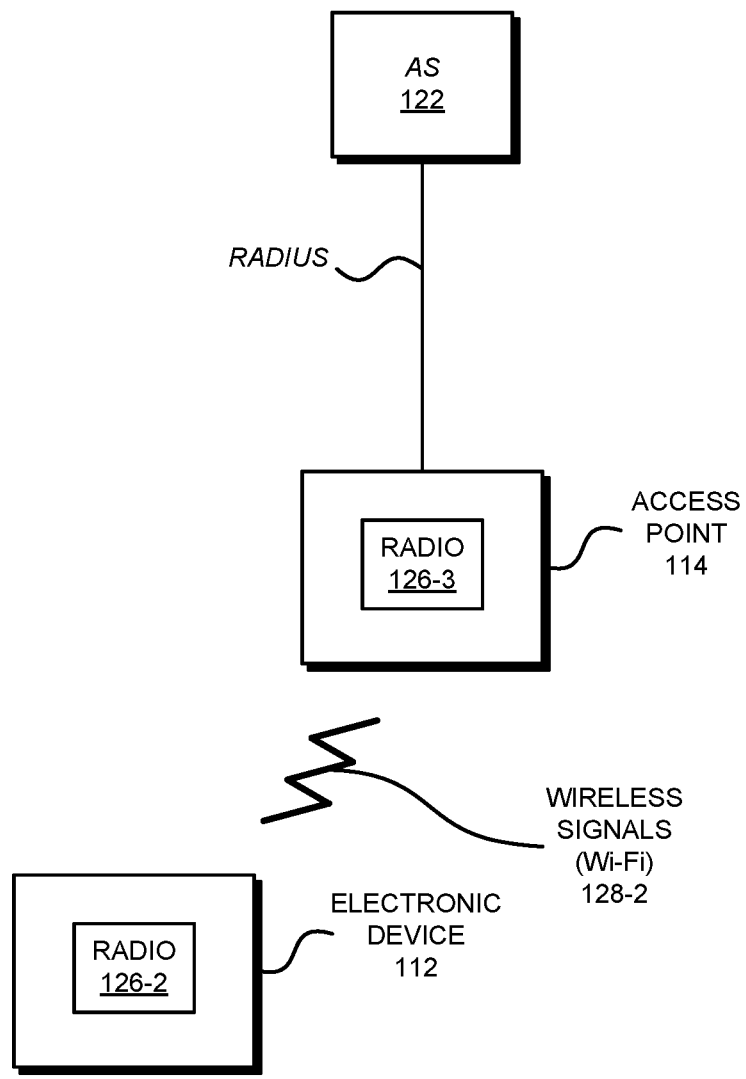
FIG. 4 is a block diagram illustrating LWA-WLAN authentication and encryption among the electronic devices in FIG. 1 in accordance with an embodiment of the present disclosure.

As described further below with reference to FIG. 4, in response to the ANQP query, access point 114 may communicate with authentication server 122 (such as a home subscriber server or HSS, or home location register or HLR) via RADIUS messaging to authenticate electronic device 112. In particular, if there is a match between the LWA_PLMN element provisioned to electronic device 112, and the LWA_PLMN element provisioned to, and being advertised by, access point 114, electronic device 112 may associate with access point 114 and may authenticate using EAP-SIM, EAP-AKA and/or EAP-AKA' depending upon the type of cellular credential it possesses.

This communication technique may be more secure than the existing proposals. In particular, dPSK may require that the Wi-Fi infrastructure play an active role in authenticating electronic device 112 to access point 114. For example, the dPSK value may need to be configured on the Wi-Fi infrastructure. In contrast, with IEEE 802.11x and EAP-SIM, EAP-AKA and/or EAP-AKA' the Wi-Fi infrastructure plays a passive role in authenticating electronic device 112 to access point 114. (As described further below, the mobile network operator authentication, authorization and accounting and the HLR/HSS may perform the actual authentication.) Thus, the IEEE 802.1x approach used in the communication technique may be more secure. Moreover, Wi-Fi radio access network partners can use existing Hotspot 2.0 WLANs, which can be enabled for LWA operation by advertising the LWA_PLMN(s) elements via ANQP. Furthermore, a single Hotspot 2.0 access point can support multiple LWA LTE partners, such as different cellular-telephone networks.

We now further describe the communication technique. FIG. 2 presents a block diagram illustrating LWA registration and provisioning between radio node 110 and electronic device 112 according to some embodiments. In particular, radio node 110 may communicate with an evolved packet core (EPC) 116 using an S1 interface to mobile management entity (MME) 118 and/or serving gateway/packet data network gateway (SlPGW) 120. (Although described in the context of S1, other or future interfaces could be used, i.e., an interface or protocol for communicating between radio node 110 and mobile management entity 118 and/or serving gateway/packet data network gateway 120.) Moreover, during the LTE registration, radio node 110 may provision the LWA_PLMN element value of a cellular-telephone network to electronic device 112. For example, the LWA_PLMN element value may be conveyed by wireless signals 128-3. Moreover, electronic device 112 may store the LWA_PLMN element for subsequent use in Hotspot 2.0 discovery and selection. For example, the LWA_PLMN element may be stored in a Wi-Fi connection manager, such as in cache 210.

Figure 3:
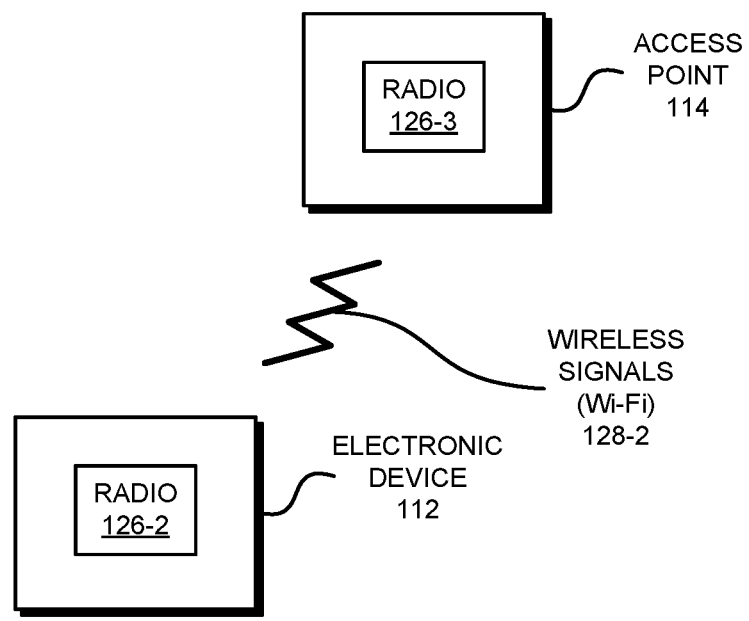
FIG. 3 is a block diagram illustrating LWA-wireless local area network (WLAN) discovery and selection between the access point and the electronic device in FIG. 1 in accordance with an embodiment of the present disclosure.

As shown in FIG. 3, which presents a block diagram illustrating LWA-WLAN discovery and selection between access point 114 and electronic device 112 according to some embodiments, in order to facilitate discovery of access point 114 by electronic device 112, the beacons broadcast by access point 114 and/or probe responses provided by access point 114 may include or advertise support for a communication protocol, such as Hotspot 2.0 and/or one or more LWA protocols (e.g., by including an LWA-capability indicator in the beacons and/or the probe responses). In response, electronic device 112 may send an ANQP query for the LWA_PLMN element(s) supported on access point 114. Then, access point 114 may send, via ANQP, a capability list with the supported LWA_PLMN element(s).

Electronic device 112 may compare its cached LWA_PLMN element value(s) from the LTE provisioning process with the LWA_PLMN element(s) returned by access point 114. If there is a match between the LWA_PLMN element values, electronic device 112 may associate with access point 114. Alternatively, if the LWA_PLMN element values do not match, electronic device 112 may not associate.

In some embodiments, in order to facilitate discovery of access point 114 by electronic device 112, the beacons broadcast by access point 114 may include an LWA-capability indicator and/or a list of the LWA_PLMN element(s) for one or more cellular-telephone networks (such as PLMN x) supported by access point 114. This information may allow electronic device 112 to determine that a cellular-telephone network associated with carrier or network x is supported by access point 114 (i.e., it is an LWA-capable Wi-Fi network) without requiring electronic device 112 to provide the ANQP query.

In addition to cellular-telephone networks, the LWA_PLMN elements may be used to indicate that access point 114 supports services or capabilities via one or more networks that are different than cellular-telephone networks associated with cellular-telephone carriers. In particular, one or more of the LWA_PLMN elements may be used to advertise a small-cell network (which is sometimes referred to as an 'LTE neutral-host network') that may be hosted by an entity (such as a company or an enterprise) that is other than a network operator or a cellular-telephone carrier. For example, such a small-cell network may have a corresponding LWA_PLMN element, which, if it is supported, may be included in the beacons broadcast by access point 114. Alternatively a small-cell network may have multiple associated LWA_PLMN identifiers that indicate networks that it supports.

Note that, by using the communication technique, the dependence on the service set identifier (SSID) of a particular WLAN network may be removed (in general, there may be multiple SSIDs associated with a given access point, such as access point 114). Instead, it may allow support for the one or more cellular-telephone networks to be indicated.

After associating with access point 114, electronic device 112 may attempt to authenticate with the cellular-telephone network. This is shown in FIG. 4, which presents a block diagram illustrating LWA-WLAN authentication and encryption among electronic device 112, access point 114 and authentication server 122 according to some embodiments. In particular, after associating with access point 114, electronic device 112 may attempt to authenticate using IEEE 802.11x using its cellular credential (e.g., via EAP-SIM, EAP-AKA and/or EAP-AKA'). In response to receiving such an authentication message, access point 114 may forward the authentication request to authentication server (AS) 122 using a RADIUS protocol over a wired (such as Ethernet) and/or a wireless connection. Note that authentication server 122 may be the home network operator's HLR/HSS, which may be accessed via a home authentication, authorization and accounting gateway.

Authentication server 122 may perform validation of the cellular credential of electronic device 112. If the authentication is successful, an acceptance or an access-accept message may be returned via RADIUS to access point 114 along with information used to generate dynamic encryption keys for the Wi-Fi session between electronic device 112 and access point 114. In response, access point 114 may provide the information to electronic device 112 and/or may use the information to generate an encryption key for use by access point 114 during the Wi-Fi session. In some embodiments, access point 114 uses the information to generate an encryption key for use by electronic device 112, which access point 114 provides to electronic device 112.

Referring back to FIG. 1, electronic device 112 and/or evolved packet core 118 may communicate information specifying access point 114 to radio node 110. In response, radio node 110 may set up a tunnel (and, more generally, a secure-communication pathway) with access point 114.

Subsequently, in conjunction with radio node 110, access point 114 may provide traffic or load balancing during LWA communication with electronic device 112. In particular, in order to facilitate the traffic or load balancing during the LWA communication with electronic device 112, radio node 110 may communicate (via wireless or wired communication) control information and data with access point 114 using the Xw interface. For example, the control information may be communicated using stream control transmission protocol (SCTP) and the data may be communicated using GTP-U. Note that the control messages may signal the binding between the tunnel endpoint identifiers (TEID) and a MAC address of electronic device 112. This communication may include an identifier of the cellular-telephone network, such as a public land mobile network (PLMN) identifier. For example, radio node 110 may be included in PLMN x, where x can represent a particular network. As noted previously, during the traffic or load balancing, radio node 110 may forward LTE data to access point 114 for communication to electronic device 112 via IEEE 802.11.

Additionally, as noted previously, in order to facilitate transmission scheduling and/or load balancing by radio node 110, electronic device 112 and/or access point 114 may provide performance feedback about the LTE communication and/or the Wi-Fi communication to radio node 110. In particular, electronic device 112 may send measurement reports (and, more generally, performance feedback) to radio node 110 for a current connection with access point 114. In some embodiments, radio node 110 optionally obtains measurement reports (and, more generally, performance feedback) directly from access point 114. Based on the performance feedback, radio node 110 may select a desired target access point (which may no longer be access point 114), and radio node 110 may direct electronic device 112 to associate with this target access point. Note that this capability may be in contrast with the normal approach used in Wi-Fi, in which electronic device 112 decides the access point that it wants to connect to or associate with.

Table 1 presents an exemplary LWA message report format according to some embodiments. Note that if all stations are disassociated, the MAC address is set to broadcast address and the status field is set to disconnect. Moreover, the RSSI may be the moving average of acknowledge-RSSI over the last N-samples because the LWA-WLAN uplink packets may be infrequent. Furthermore, the packet error rate may be defined as the ratio of dropped packets to the number of transmit attempts. Packets that are dropped between the Ethernet interface and ingress into the wireless interface may not be accounted for in the packet error rate, and the queue delay may be a moving average of the time taken to transmit a packet (including the queuing, scheduling and/or retransmit time). Additionally, the access time may be the time taken to access the channel after the packet has been placed into the hardware queue. This access time may exclude the transmission time of the packet. In some embodiments, the access time is a moving average over a window.

TABLE 1

| Field | Length (Bytes) | Information |
| --- | --- | --- |
| Number of stations | 2 | Number of stations being reported |
| MAC address | 6 | Wi-Fi MAC address of the electronic device |
| Status | 1 | Connected/Disconnected |
| Received signal strength indicator (RSSI) | 1 | −127 to 127 dB |
| Number of wireless mobility management (WMM) reports | 1 | Number of queues being reported for station |
| WMM queue identifier | 1 | 0 = Background, 1 = Best effort, 2 = Video, 3 = Voice |
| Packet error rate | 1 | Ratio of dropped packets to good packets transmitted since last report |
| Queue delay | 2 | Since last report in milliseconds |
| Access time | 2 | Time to gain access to the channel (microseconds) |

In some embodiments, at least some of the operations performed by access point 114 in the preceding discussion are performed by an optional WLAN controller (WLC) 124.

Figure 5:
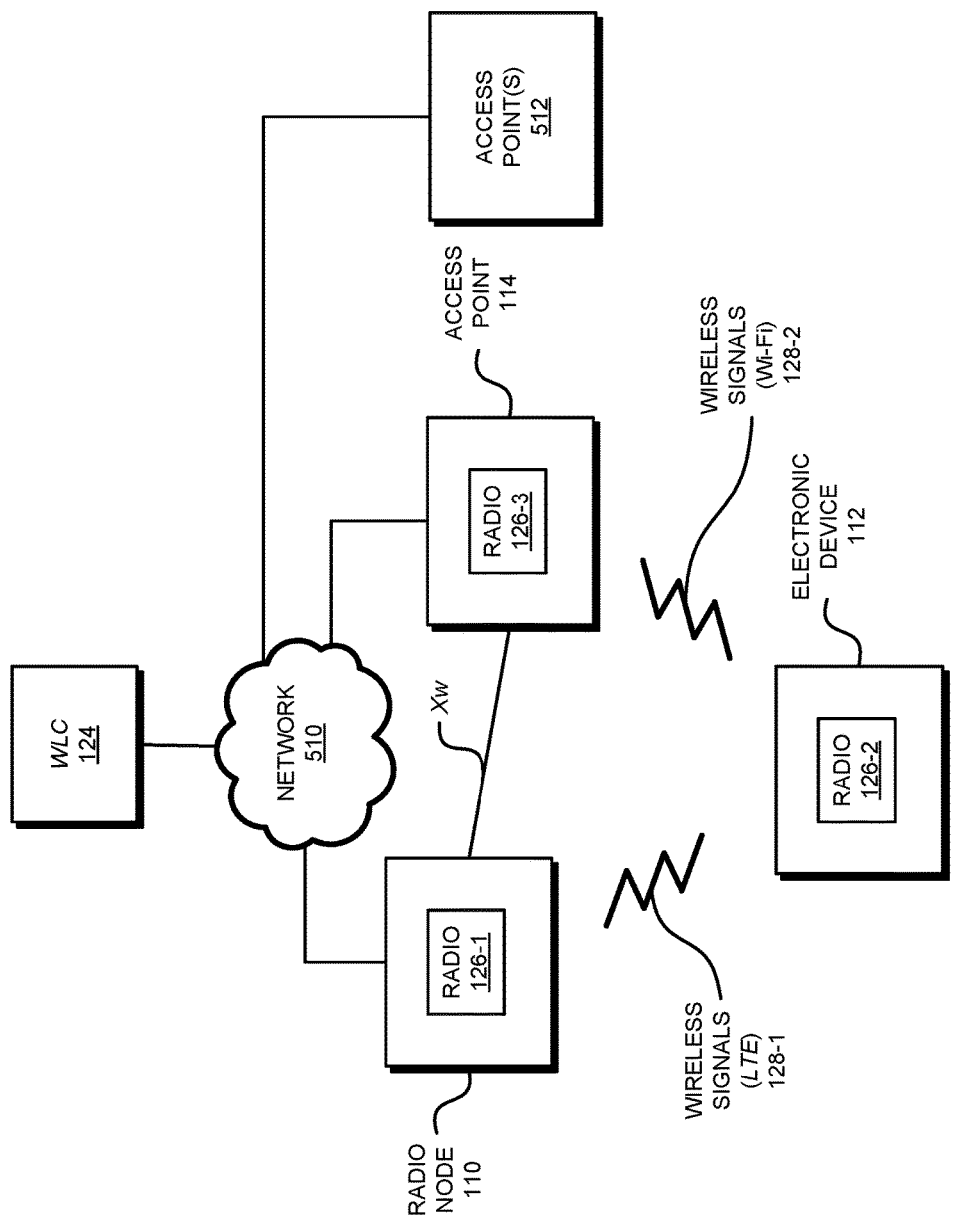
FIG. 5 is a block diagram illustrating electronic devices wirelessly communicating in accordance with an embodiment of the present disclosure.

Alternatively, another approach to discovery and security may be used. In particular, instead of provisioning electronic device 112 using radio node 110 during the LTE registration process, and then authenticating via authentication server 122, the discovery and security may be facilitated by WLAN controller 124. This is shown in FIG. 5, which presents a block diagram illustrating wireless communication among electronic devices according to some embodiments. In FIG.

5, access point 114 may advertise support for one or more cellular-telephone networks by including one or more PLMN identifiers in messages (such as beacons) that are broadcast by access point 114. (While PLMN identifiers are used as an illustration, other identifiers of the one or more cellular-telephone networks may be used. In addition, in some embodiments access point 114 includes a vendor extension information element with the one or more PLMN indicators in beacons and probe responses.) Electronic device 112 may receive one of these messages, thereby discovering access point 114. Moreover, electronic device 112 may receive additional messages from one or more access points 512.

Then, electronic device 112 may provide a candidate list to radio node 110 with information (such as basic service set identifiers or BSSIDs) specifying access point 114 and/or the one or more access points 512 that support communication with the cellular-telephone network that is associated with radio node 110. (In some embodiments, the messages include access-point loading status along with the one or more PLMNs to help electronic device 112 and/or radio node 110 in sorting out potential candidate access points.)

After receiving the candidate list, as a security measure radio node 110 may communicate with WLAN controller 124 via network 510 (such as a wireless network and/or a wired network, e.g., an intranet and/or the Internet) to validate access point 114 and/or the one or more access points 512 with WLAN controller 124. In particular, radio node 110 may provide information (such as the BSSIDs) specifying access point 114 and/or the one or more access points 512 to WLAN controller 124. Note that the communication between radio node 110 and WLAN controller 124 may use a Xw interface (and, more generally, an interface having the same or similar functionality, i.e., an interface or protocol for communicating between radio node 110 and WLAN controller 124).

In response, WLAN controller 124 may access a stored network address (such as an Internet address) of access point 114 (if access point 114 is an approved access point) and performance feedback about access point 114. In some embodiments, WLAN controller 124 communicates with EPC 116 (FIG. 1) via the Xw interface (however, other interfaces may be used). Moreover, WLAN controller 124 may provide the network address and the performance feedback (such as that shown in Table 1 and, more generally, a channel measurement report) to radio node 110. Next, WLAN controller 124 may provide additional information specifying radio node 110 (such as an identifier of radio node 110) to access point 114.

Radio node 110 and access point 114 may, respectively, receive the network address and the performance feedback, and the additional information. In response, radio node 110 may set up a secure-communication pathway (such as a GTP-U tunnel) with access point 114 using the network address, and access point 114 may establish the secure-communication pathway with radio node 110 based on the additional information. As described previously, the secure-communication pathway may take data associated with frames for the LTE communication protocol and may encapsulate the data in frames for the IEEE 802.11 communication protocol.

Additionally, radio node 110 may instruct electronic device 112 to associate with access point 114. As noted previously, this approach is different from the usual one in which electronic device 112 initiates association. In response, electronic device 112 may associate with access point 114, thereby establishing a Wi-Fi connection between electronic device 112 and access point 114.

Subsequently, radio node 110 can communicate LTE data frames or packets using LTE with an electronic device 112 and, based on the performance feedback, radio node 110 may also communicate LTE data frames or packets to access point 114 via the interface, such as the Xw interface (and, more generally, an interface that is similar to X2 or a general packet radio service tunneling protocol, such as GTP-U, which provides the secure-communication pathway between radio node 110 and access point 114), that encapsulates the LTE PDCP datagrams into IEEE 802.11 MAC frames. Moreover, access point 114 may communicate these IEEE 802.11 frames or packets to electronic device 112 using Wi-Fi, electronic device 112 may aggregate or re-concatenate the two sources of data frames or packets back into the LTE data stream with LTE PDCP datagrams.

In some embodiments, WLAN controller 124 provides, to radio node 110, network addresses of multiple access points (such as access points 114 and the one or more access points 512) and performance feedback about the multiple access points. Next, radio node 110 may select a desired or target access point (such as access point 114) from the multiple access points based on the performance feedback. This selection may be performed dynamically during communication with electronic device 112 as the performance feedback subsequently received from electronic device 112, access point 114, the one or more access points 512 and/or WLAN controller 124 changes. For example, access point 114 may send the performance feedback information directly to radio node 110 or indirectly via WLAN controller 124. Thus, at different times, radio node 110 may decide to handover the Wi-Fi communication from one access point to another access point, i.e., radio node 110 may use different access points for traffic or load balancing during LWA communication with electronic device 112.

Note that such a handoff may be mediated or facilitated by WLAN controller 124 or may be performed independently of WLAN controller 124. For example, electronic device 112 may send measurement reports (and, more generally, performance feedback) to radio node 110 for a current connection access point (such as access point 114) plus one or more potential handover target access points. Moreover, radio node 110 may obtain measurement reports (and, more generally, performance feedback) for the one or more target access points from WLAN controller 124. In some embodiments, radio node 110 optionally obtains measurement reports (and, more generally, performance feedback) directly from the one or more target access points. Then, radio node 110 may select a desired target access point and may direct electronic device 112 to associate with this target access point. Next, radio node 110 may forward LTE data to the new target access point for communication to electronic device 112 using LWA communication protocol.

In some embodiments, the performance feedback is included in a consolidated report that includes one or more electronic devices (such as electronic device 112) and/or one or more access points (such as access point 114). This report may be sent for: associations, re-associations, disconnections, and/or threshold crossing for queue status, access time and queue delay. Note that the consolidated report may be communicated periodically via a configurable time period (in seconds).

In general, the wireless communication in FIGS. 1 and 5 may be characterized by a variety of performance metrics, such as: a data rate for successful communication (which is sometimes referred to as a 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

During the communication in FIGS. 1 and 5, radio node 110, electronic device 112 and/or access point 114 may wirelessly communicate while: transmitting advertising frames on wireless channels, detecting one another by scanning wireless channels, establishing connections (for example, by transmitting association requests), and/or transmitting and receiving frames that include packets (which may include the association requests and/or additional information as payloads).

Figure 10:
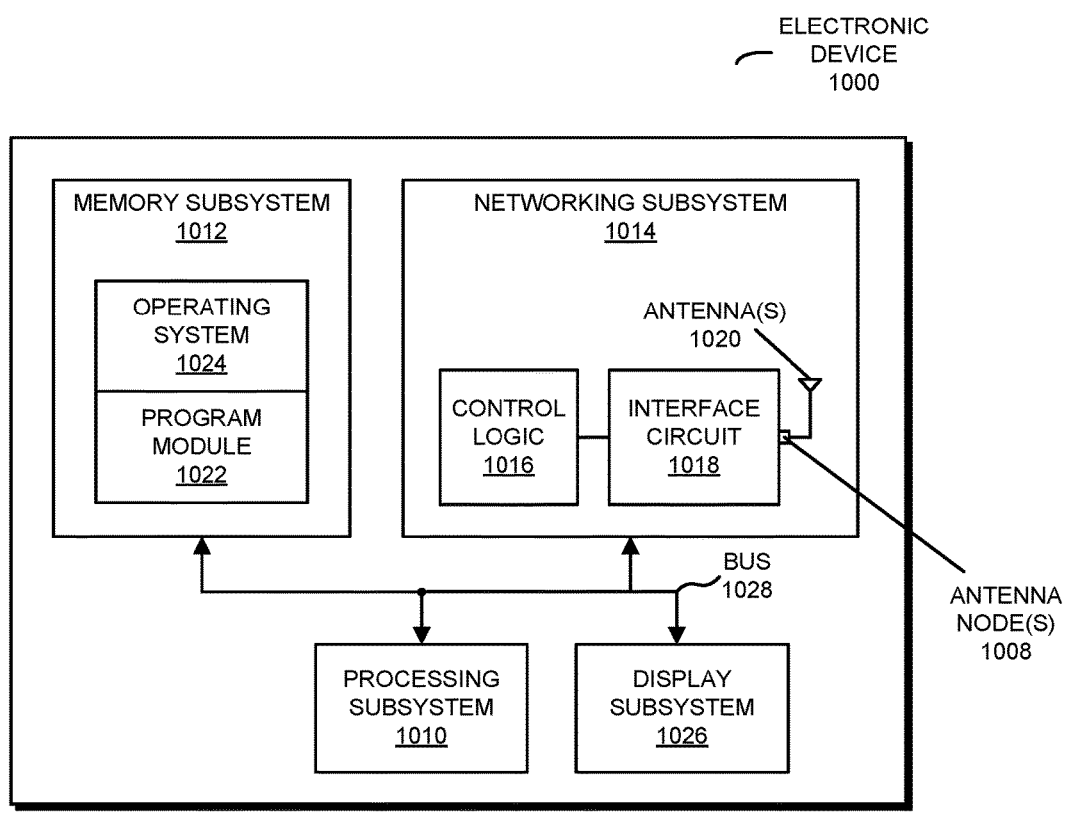
FIG. 10 is a block diagram illustrating an electronic device in accordance with an embodiment of the present disclosure.

As described further below with reference to FIG. 10, radio node 110, electronic device 112 and access point 114 may include subsystems, such as a networking subsystem, a memory subsystem and a processor subsystem. In addition, radio node 110, electronic device 112 and access point 114 may include radios 126 in the networking subsystems. More generally, radio node 110, electronic device 112 and access point 114 can include (or can be included within) any electronic devices with the networking subsystems that enable radio node 110, electronic device 112 and access point 114 to wirelessly communicate with each other. This wireless communication can comprise transmitting advertisements on wireless channels to enable electronic devices to make initial contact or detect each other, followed by exchanging subsequent data/management frames (such as association requests and responses) to establish a connection, configure security options (e.g., Internet Protocol Security, Wi-Fi Protected Access), transmit and receive frames that include packets via the connection, etc.

Moreover, as can be seen in FIGS. 1 and 5, wireless signals 128 (represented by jagged lines) are transmitted by radios 126 in radio node 110, electronic device 112 and/or access point 114. For example, radio 126-3 in access point 114 may transmit information (such as frames that include packets) using wireless signals 128-2. These wireless signals are received by radios 126 in one or more other electronic devices (such as radio 126-2 in electronic device 112). This may allow access point 114 to communicate information to radio node 110 and/or electronic device 112. Note that wireless signals 128-1 may convey LTE frames or packets, and wireless signals 128-2 may convey Wi-Fi frames or packets.

In the described embodiments, processing a frame that includes packets in radio node 110, electronic device 112 and/or access point 114 may include: receiving the wireless signals with the frame; decoding/extracting the frame from the received wireless signals to acquire the frame; and processing the frame to determine information contained in the payload of the frame (such as the packet).

Although we describe the network environments shown in FIGS. 1 and 5 as examples, in alternative embodiments, different numbers or types of electronic devices may be present. For example, some embodiments comprise more or fewer electronic devices. As another example, in another embodiment, different electronic devices are transmitting and/or receiving frames that include packets.

Figure 6:
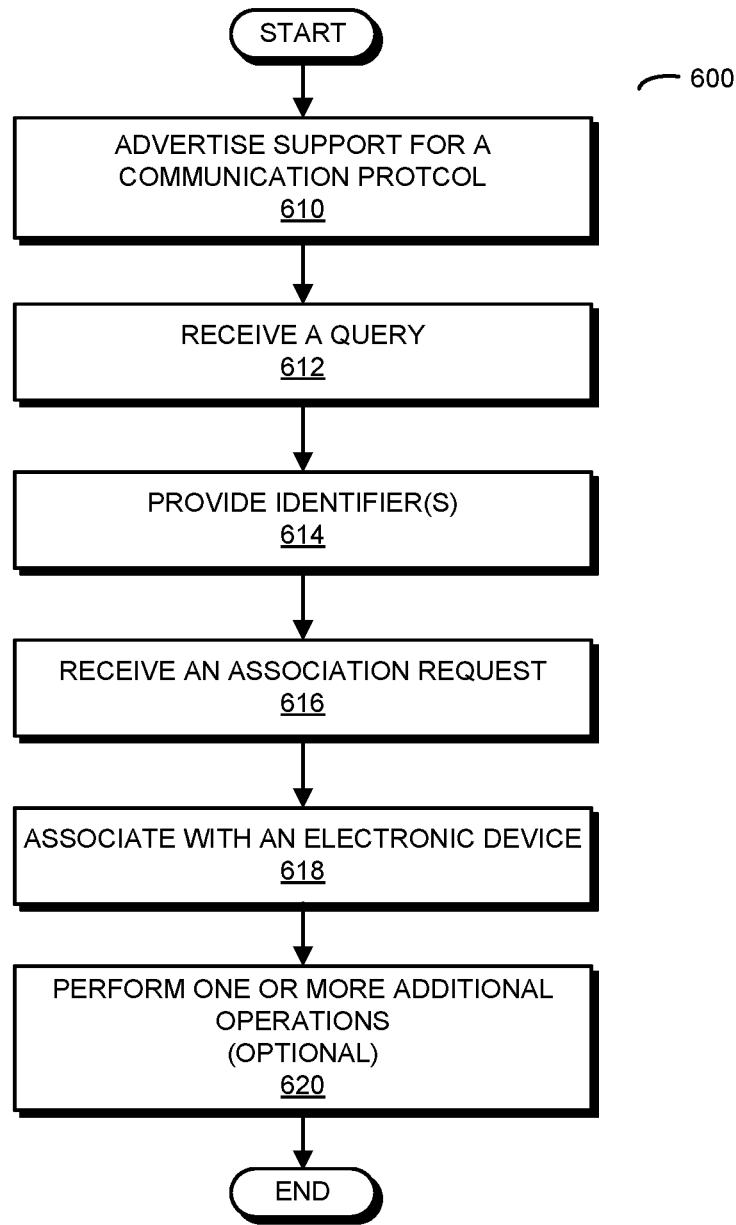
FIG. 6 is a flow diagram illustrating a method for establishing communication with an electronic device and a cellular-telephone network in accordance with an embodiment of the present disclosure.

We now describe embodiments of methods. FIG. 6 presents a flow diagram illustrating a method 600 for establishing communication with an electronic device and a cellular-telephone network according to some embodiments. This method may be performed by an access point (or a WLAN controller), such as access point 114 (FIG. 1). During operation, the access point advertises support for a communication protocol (operation 610) in beacons and/or probe responses. For example, the communication protocol may include: a Hotspot 2.0 protocol, and/or one or more LWA protocols.

Then, the access point receives, from the electronic device, a query (operation 612) for identifiers of one or more cellular-telephone networks supported by the access point. For example, the query may be compatible with an ANQP and the identifiers may include PLMN identifiers.

Moreover, in response to the query the access point provides, to the electronic device, the identifiers (operation 614) of the one or more cellular-telephone networks that provide communication via one or more LWA protocols, and which are supported by the access point.

Next, the access point receives, from the electronic device, an association request (operation 616), and associates with the electronic device (operation 618) in response to the association request.

In some embodiments, the access point optionally performs one or more additional operations (operation 620). For example, the access point may receive, from the electronic device, an authentication request with credentials of the electronic device with the cellular-telephone network, and the access point may forward the authentication request to a server associated with the cellular-telephone network. In particular, the access point may communicate the authentication request with the server via a RADIUS protocol. Additionally, the access point may receive, from the server, an acceptance message that includes information used to generate encryption keys for an IEEE 802.11 session between the access point and the electronic device. The access point may provide this information to the electronic device and/or may use the information to generate an encryption key for use by the access point during the IEEE 802.11 session. Alternatively or additionally, the access point may assist the radio node in performing load or traffic balancing with the electronic device. In particular, the access point may receive, from the radio node, LTE PDCP datagrams that are encapsulated into IEEE 802.11 MAC frames. Then, the access point may communicate the IEEE 802.11 MAC frames to the electronic device. Note that the load balancing may involve LWA protocols such as: transport protocols (e.g., GTP-U over UDP) and/or Xw-c/m over SCTP), a control protocol, a management protocol, and/or user traffic over these transports.

Figure 7:
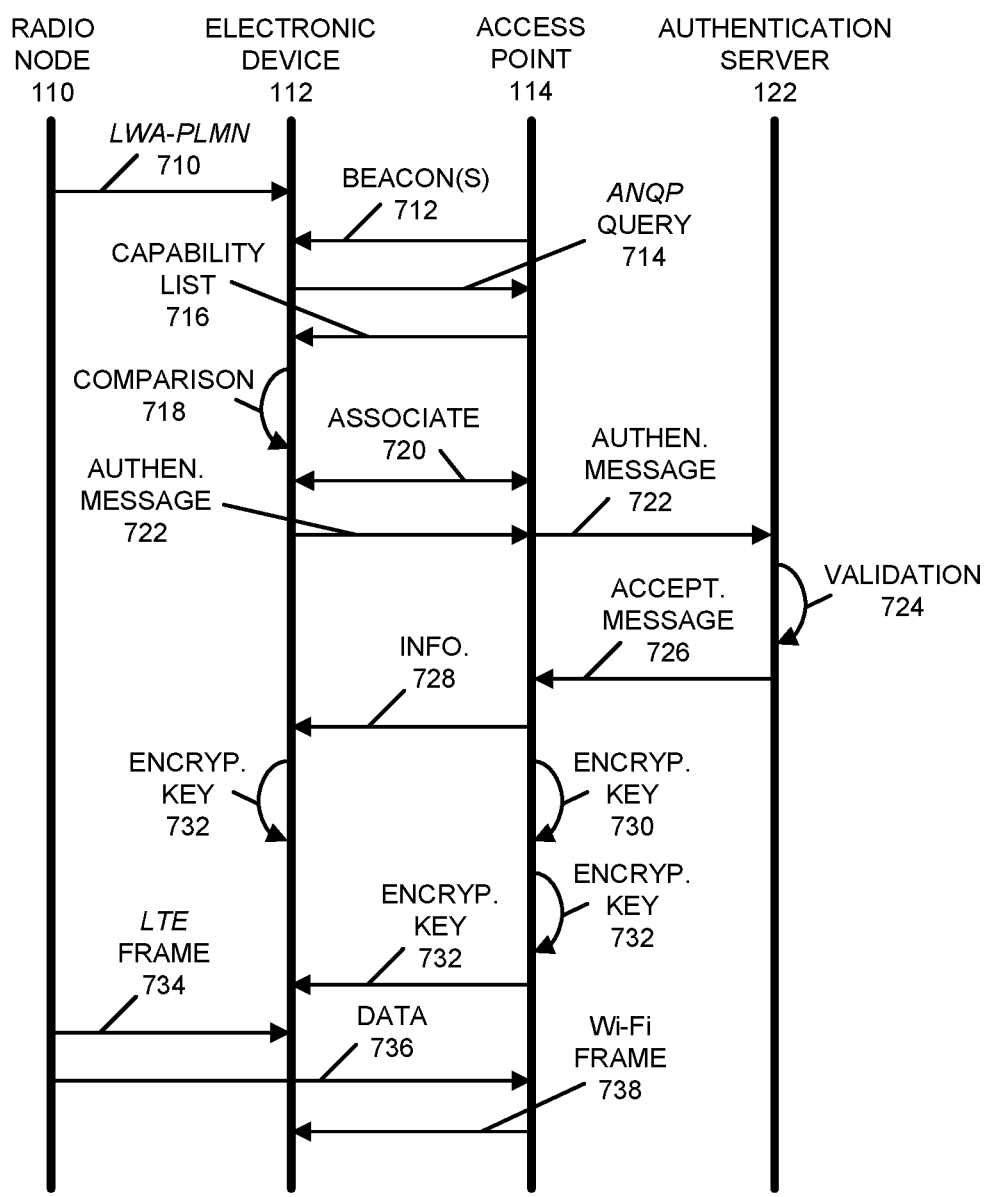
FIG. 7 is a drawing illustrating communication among the electronic devices in FIG. 1 in accordance with an embodiment of the present disclosure.

Embodiments of the communication technique are further illustrated in FIG. 7, which presents a drawing illustrating communication between radio node 110, electronic device 112, access point 114 and authentication server 122 according to some embodiments. In particular, during the LTE registration, radio node 110 may provision LWA_PLMN 710 element value of a cellular-telephone network to electronic device 112.

Subsequently (but not necessarily), access point 114 may broadcast beacons 712 that include or advertise support for a communication protocol, such as Hotspot 2.0 and/or one or more LWA protocols. In response, electronic device 112 may send an ANQP query 714 for the LWA_PLMN element(s)

supported on access point 114. Then, access point 114 may send, via ANQP, a capability list 716 with the supported LWA_PLMN element(s).

Electronic device 112 may compare 718 the pre-provisioned LWA_PLMN 710 element value with the LWA_PLMN element(s) returned by access point 114. If there is a match between the LWA_PLMN element values, electronic device 112 may associate 720 with access point 114. Alternatively, if the LWA_PLMN element values do not match, electronic device 112 may not associate.

Then, electronic device 112 may attempt to authenticate using IEEE 802.11x using its cellular credential in an authentication message 722. In response, access point 114 may forward authentication message 722 to authentication server 122 using a RADIUS protocol over a wired (such as Ethernet) and/or a wireless connection.

Authentication server 122 may perform validation 724 of the cellular credential of electronic device 112. If the authentication is successful, an acceptance message 726 may be returned via RADIUS to access point 114 along with information 728 used to generate dynamic encryption keys for the Wi-Fi session between electronic device 112 and access point 114. In response, access point 114 may provide information 728 to electronic device 112 and/or may use information 728 to generate an encryption key 730 for use by access point 114 during the Wi-Fi session. In some embodiments, access point 114 uses information 728 to generate an encryption key 732 for use by electronic device 112, which access point 114 provides to electronic device 112. Otherwise, electronic device 112 may use information 728 to generate encryption key 732.

Furthermore, subsequently radio node 110 may communicate LTE frames 734 with electronic device 112, and may perform load or traffic balancing by communicating data 736 to access point 114, which then communicates Wi-Fi frames 738 that include data 736 to electronic device 112.

Figure 8:
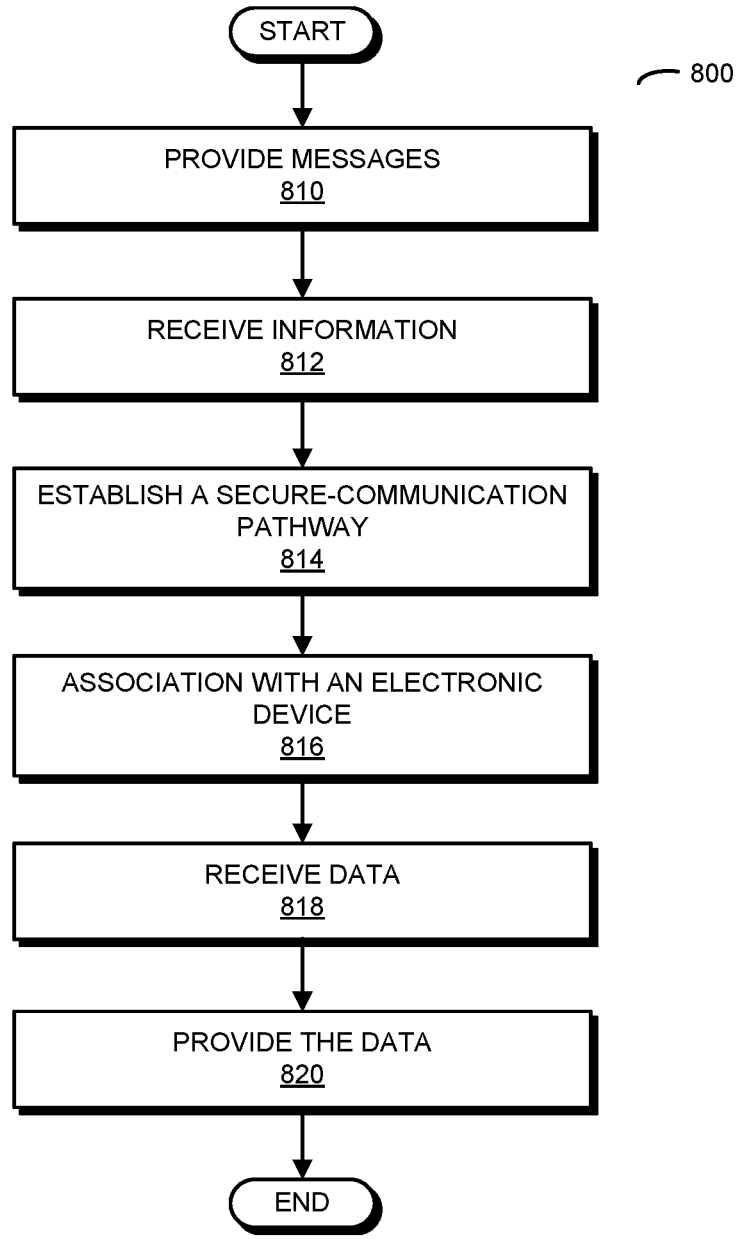
FIG. 8 is a flow diagram illustrating a method for establishing communication with an electronic device and a cellular-telephone network in accordance with an embodiment of the present disclosure.

FIG. 8 presents a flow diagram illustrating a method 800 for establishing communication with an electronic device and a cellular-telephone network according to some embodiments. This method may be performed by an access point, such as access point 114 (FIG. 1). During operation, the access point provides messages (operation 810) that include one or more PLMN identifiers of one or more cellular-telephone networks that are supported by the access point. Then, the access point receives information (operation 812) specifying a radio node from the WLAN controller. (However, in other embodiments the order of operations 810 and 812 are reversed.) Moreover, the access point establishes a secure-communication pathway (operation 814) with the radio node based on the information, where the secure-communication pathway takes data associated with frames for a Long Term Evolution (LTE) communication protocol and encapsulates the data in frames for an IEEE 802.11 communication protocol. Next, the access point associates with an electronic device (operation 816). Furthermore, the access point receives data (operation 818) for the electronic device from the radio node via the secure-communication pathway, and provides the data (operation 820) to the electronic device using the IEEE 802.11 communication protocol.

Figure 9:
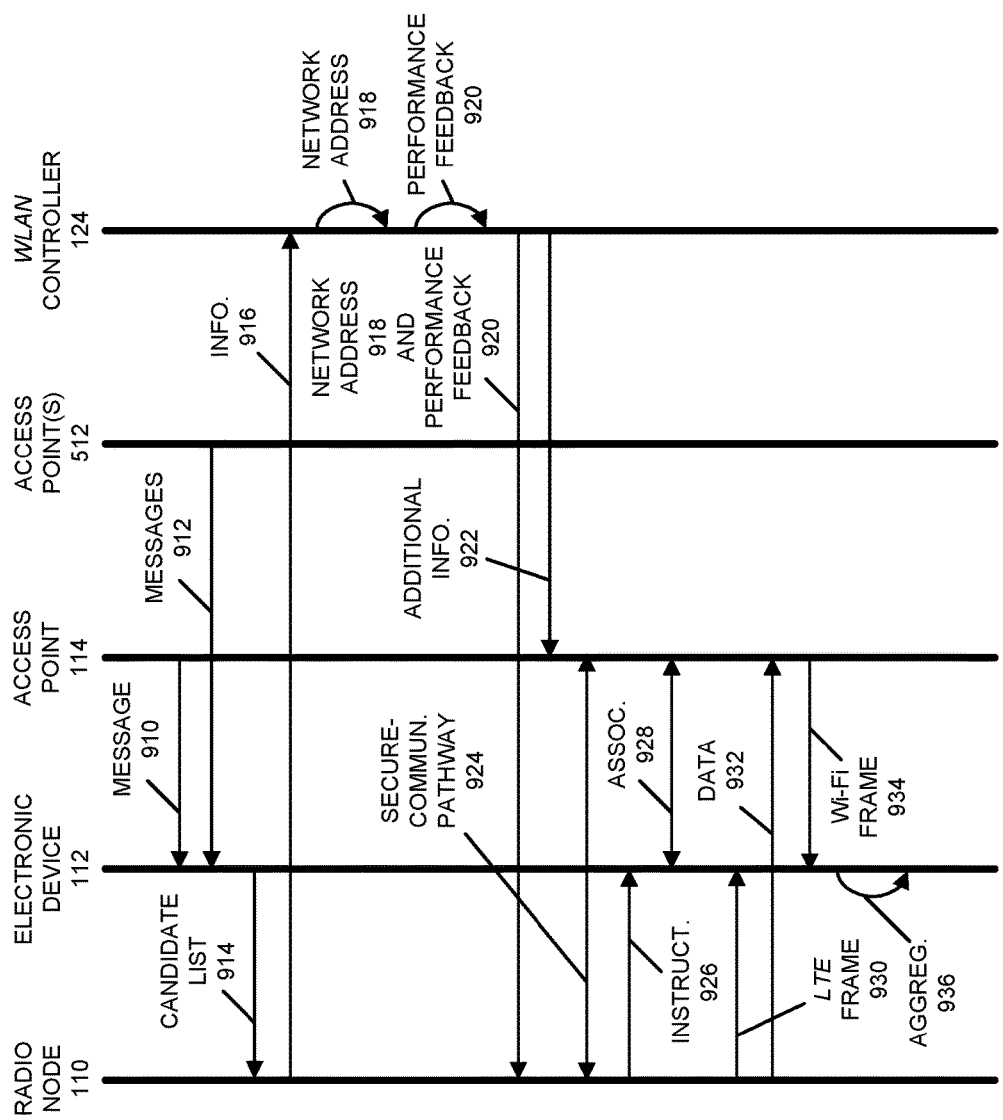
FIG. 9 is a drawing illustrating communication among the electronic devices in FIG. 5 in accordance with an embodiment of the present disclosure.

Embodiments of the communication technique are further illustrated in FIG. 9, which presents a drawing illustrating communication between radio node 110, electronic device 112 access point 114 and access points 512 according to some embodiments. In particular, access point 114 may advertise support for one or more cellular-telephone networks by including one or more PLMN identifiers in messages 910 that are broadcast by access point 114. Electronic 112 may receive one of these messages. Moreover, electronic device 112 may receive additional messages 912 from one or more access points 512.

Then, electronic device 112 may provide a candidate list 914 to radio node 110 with information specifying access point 114 and/or the one or more access points 512 that support communication with the cellular-telephone network that is associated with radio node 110.

After receiving candidate list 914, radio node 110 may provide information 916 specifying access point 114 and/or the one or more access points 512 to WLAN controller 124. In response, WLAN controller 124 may access a stored network address 918 of access point 114 and performance feedback 920 about access point 114. Furthermore, WLAN controller 124 may provide network address 918 and performance feedback 920 to radio node 110. Next, WLAN controller 124 may provide additional information 922 specifying radio node 110 to access point 114.

In response to radio node 110 receiving network address 918 and performance feedback 920, and access point 114 receiving additional information 922, radio node 110 and access point 114 may set up a secure-communication pathway 924.

Additionally, radio node 110 may instruct 926 electronic device 112 to associate with access point 114. In response, electronic device 112 may associate 928 with access point 114, thereby establishing a Wi-Fi connection between electronic device 112 and access point 114.

Subsequently, radio node 110 can communicate LTE data frames 930 using LTE with an electronic device 112 and, based on performance feedback 920, radio node 110 may perform load or traffic balancing by communicating data 932 to access point 114, which then communicates Wi-Fi frames 934 that include data 932 to electronic device 112. Furthermore, electronic device 112 may aggregate 936 or re-concatenate the two sources of data frames or packets back into the LTE data stream with LTE PDCP datagrams.

In some embodiments of methods 600 (FIG. 6) and/or 800, there may be additional or fewer operations. Moreover, the order of the operations may be changed, and/or two or more operations may be combined into a single operation.

We now describe embodiments of an electronic device, such as radio node 110, electronic device 112, access point 114 and/or WLAN controller 124 in FIGS. 1 and 5 that performs at least some of the operations in the communication technique. FIG. 10 presents a block diagram illustrating an electronic device 1000 in accordance with some embodiments. This electronic device includes processing subsystem 1010, memory subsystem 1012, and networking subsystem 1014. Processing subsystem 1010 includes one or more devices configured to perform computational operations. For example, processing subsystem 1010 can include one or more microprocessors, application-specific integrated circuits (ASICs), microcontrollers, programmable-logic devices, and/or one or more digital signal processors (DSPs).

Memory subsystem 1012 includes one or more devices for storing data and/or instructions for processing subsystem 1010 and networking subsystem 1014. For example, memory subsystem 1012 can include dynamic random access memory (DRAM), static random access memory (SRAM), and/or other types of memory. In some embodiments, instructions for processing subsystem 1010 in memory subsystem 1012 include: one or more program modules or sets of instructions (such as program module 1022 or operating system 1024), which may be executed by processing subsystem 1010. Note that the one or more computer programs may constitute a computer-program mechanism. Moreover, instructions in the various modules in memory subsystem 1012 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 1010.

Networking subsystem 1014 includes one or more devices configured to couple to and communicate on a wired and/or wireless network (i.e., to perform network operations), including: control logic 1016, an interface circuit 1018 and one or more antennas 1020 (or antenna elements). (While FIG. 10 includes one or more antennas 1020, in some embodiments electronic device 1000 includes one or more antenna nodes, such as nodes 1008, e.g., a pad, which can be coupled to the one or more antennas 1020. Thus, electronic device 1000 may or may not include the one or more antennas 1020.) For example, networking subsystem 1014 can include a Bluetooth™ networking system, a cellular networking system (e.g., a 3G/4G network such as UMTS, LTE, etc.), a universal serial bus (USB) networking system, a networking system based on the standards described in IEEE 802.11 (e.g., a Wi-Fi® networking system), an Ethernet networking system, and/or another networking system.

Networking subsystem 1014 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 1000 may use the mechanisms in networking subsystem 1014 for performing simple wireless communication between the electronic devices, e.g., transmitting advertising or beacon frames and/or scanning for advertising frames transmitted by other electronic devices as described previously.

Within electronic device 1000, processing subsystem 1010, memory subsystem 1012, and networking subsystem 1014 are coupled together using bus 1028. Bus 1028 may include an electrical, optical, and/or electro-optical connection that the subsystems can use to communicate commands and data among one another. Although only one bus 1028 is shown for clarity, different embodiments can include a different number or configuration of electrical, optical, and/or electro-optical connections among the subsystems.

In some embodiments, electronic device 1000 includes a display subsystem 1026 for displaying information on a display.

Electronic device 1000 can be (or can be included in) any electronic device with at least one network interface. For example, electronic device 1000 can be (or can be included in): a desktop computer, a laptop computer, a subnotebook/netbook, a server, a tablet computer, a smartphone, a cellular telephone, a consumer-electronic device, a portable computing device, an access point, a transceiver, a router, a switch, communication equipment, test equipment, and/or another electronic device.

Although specific components are used to describe electronic device 1000, in alternative embodiments, different components and/or subsystems may be present in electronic device 1000. For example, electronic device 1000 may include one or more additional processing subsystems, memory subsystems, networking subsystems, and/or display subsystems. Additionally, one or more of the subsystems may not be present in electronic device 1000. Moreover, in some embodiments, electronic device 1000 may include one or more additional subsystems that are not shown in FIG. 10. Also, although separate subsystems are shown in FIG. 10, in some embodiments some or all of a given subsystem or component can be integrated into one or more of the other subsystems or component(s) in electronic device 1000. For example, in some embodiments program module 1022 is included in operating system 1024 and/or control logic 1016 is included in interface circuit 1018.

While the preceding discussion used Wi-Fi and LTE communication protocols as illustrative examples, in other embodiments a wide variety of cellular-telephone communication protocols and, more generally, wireless communication techniques may be used. Thus, the communication technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication technique may be implemented using program module 1022, operating system 1024 (such as a driver for interface circuit 1018) or in firmware in interface circuit 1018. Alternatively or additionally, at least some of the operations in the communication technique may be implemented in a physical layer, such as hardware in interface circuit 1018.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An access point, comprising:
   at least one antenna node configured to couple to an antenna;
   an interface circuit, coupled to at least the one antenna node, configured to communicate with a radio node in a cellular-telephone network and a wireless-local-area-network (WLAN) controller, wherein the interface circuit is configured to:
   provide, from the interface circuit, messages that include one or more identifiers of one or more cellular-telephone networks that are supported by the access point, wherein a given identifier specifies a given supported cellular-telephone network;

receive, at the interface circuit, information specifying the radio node, wherein the information is included in communication associated with the WLAN controller; and establish, via the interface circuit, a secure-communication pathway with the radio node based on the information, wherein the interface circuit is configured to communicate via the secure-communication pathway by taking data associated with frames for a cellular-telephone communication protocol that include second information that specifies the radio node and encapsulating the data in frames for an IEEE 802.11 communication protocol that include third information that specifies an electronic device.

2. The access point of claim 1, further comprising the antenna coupled to at least the one antenna node.

3. The access point of claim 1, wherein the cellular-telephone communication protocol comprises Long Term Evolution (LTE) and the radio node comprises an evolved node B (eNB).

4. The access point of claim 1, wherein the secure-communication pathway comprises a tunnel.

5. The access point of claim 1, wherein the interface circuit is configured to:
associate, via the interface circuit, with the electronic device;
receive, at the interface circuit and via the secure-communication pathway, the data intended for the electronic device, wherein the data is associated with the radio node; and
provide, from the interface circuit, the data intended for the electronic device using the IEEE 802.11 communication protocol.

6. The access point of claim 1, wherein the one or more identifiers comprise public land mobile network (PLMN) identifiers.

7. An electronic device, comprising:
at least one antenna node configured to couple to an antenna;
an interface circuit, coupled to at least the one antenna node, configured to communicate with an access point and a radio node associated with a cellular-telephone network, wherein the interface circuit is configured to:
discover, via the interface circuit, the access point, wherein the discovery involves receiving, at the interface circuit, one or more messages that include information associated with the access point, wherein the one or more messages include one or more identifiers of one or more cellular-telephone networks that are supported by the access point, wherein a given identifier specifies a given supported cellular-telephone network, and wherein the one or more cellular-telephone networks include at least the cellular-telephone network associated with the radio node;
provide, from the interface circuit, a candidate list intended for the radio node with second information specifying the access point; and
receive, at the interface circuit, an instruction, associated with the radio node, to associate with the access point.

8. The electronic device of claim 7, further comprising the antenna coupled to at least the one antenna node.

9. The electronic device of claim 7, wherein the interface circuit is configured to:

receive data that includes third information that specifies the radio node via the access point using an IEEE 802.11 communication protocol; and receive additional data included in communication associated with the radio node using a Long Term Evolution (LTE) communication protocol.

10. The electronic device of claim 9, wherein the interface circuit is configured to aggregate the data and the additional data into LTE datagrams to re-stablish an LTE data stream.

11. The electronic device of claim 7, wherein the radio node comprises an evolved node B (eNB).

12. The electronic device of claim 7, wherein the interface circuit is configured to receive, at the interface circuit, data associated with the access point and the radio node, wherein the data is included in one or more frames, which include the information specifying the access point, using an IEEE 802.11 communication protocol.

13. A non-transitory computer-readable storage medium for use in conjunction with an access point, the computer-readable storage medium storing program instructions that, when executed by the access point, establishes a secure-communication pathway by causing the access point to perform operations comprising:

providing, from an interface circuit in the access point, messages that include one or more identifiers of one or more cellular-telephone networks that are supported by the access point, wherein a given identifier specifies a given supported cellular-telephone network;

receiving, at the interface circuit, information specifying a radio node associated with a cellular-telephone network, wherein the information is included in communication associated with a wireless-local-area-network (WLAN) controller; and establishing, via the interface circuit, the secure-communication pathway with the radio node based on the information, wherein the interface circuit communicates via the secure-communication pathway by taking data associated with frames for a cellular-telephone communication protocol that include second information that specifies the radio node and encapsulating the data in frames for an IEEE 802.11 communication protocol that include third information that specifies an electronic device.

14. The computer-readable storage medium of claim 13, wherein the cellular-telephone communication protocol comprises Long Term Evolution (LTE) and the radio node comprises an evolved node B (eNB).

15. The computer-readable storage medium of claim 13, wherein the secure-communication pathway comprises a tunnel.

16. The computer-readable storage medium of claim 13, wherein the operations comprise:
associating, via the interface circuit, with the electronic device;
receiving, at the interface circuit and via the secure-communication pathway, the data intended for the electronic device, wherein the data is associated with the radio node; and
providing, from the interface circuit, the data intended for the electronic device using the IEEE 802.11 communication protocol.

17. A method for establishing a secure-communication pathway, comprising:
by an access point:
providing, from an interface circuit in the access point, messages that include one or more identifiers of one or more cellular-telephone networks that are supported by the access point, wherein a given identifier specifies a given supported cellular-telephone network;

receiving, at the interface circuit, information specifying a radio node associated with a cellular-telephone network, wherein the information is included in communication associated with a wireless-local-area-network (WLAN) controller; and establishing, via the interface circuit, the secure-communication pathway with the radio node based on the information, wherein the interface circuit communicates via the secure-communication pathway by taking data associated with frames for a cellular-telephone communication protocol that include second information that specifies the radio node and encapsulating the data in frames for an IEEE 802.11 communication protocol that include third information that specifies an electronic device.

18. The method of claim 17, wherein the cellular-telephone communication protocol comprises Long Term Evolution (LTE) and the radio node comprises an evolved node B (eNB).

19. The method of claim 17, wherein the secure-communication pathway comprises a tunnel.

20. The method of claim 17, wherein the method comprises:

associating, via the interface circuit, with the electronic device;

receiving, at the interface circuit and via the secure-communication pathway, the data intended for the electronic device, wherein the data is associated with the radio node; and providing, from the interface circuit, the data intended for the electronic device using the IEEE 802.11 communication protocol.

* * * * *